(12) United States Patent
Potts

(10) Patent No.: US 6,312,125 B1
(45) Date of Patent: Nov. 6, 2001

(54) RELAXATION SUNGLASSES HAVING ABSORBENT ELEMENT FOR RETAINING AROMATIC FLUIDS

(76) Inventor: Kevin D. Potts, 10828 Hartle Dr., Hagerstown, MD (US) 21742

( * ) Notice: Subject to any disclaimer, the term of this patent is extended or adjusted under 35 U.S.C. 154(b) by 0 days.

(21) Appl. No.: 09/632,044

(22) Filed: Aug. 3, 2000

(51) Int. Cl.[7] .................................................. G02C 11/08
(52) U.S. Cl. ............................................. 351/62; 351/158
(58) Field of Search ................... 351/41, 44, 62, 351/83, 87, 154, 158

(56) References Cited

U.S. PATENT DOCUMENTS

| | | |
|---|---|---|
| D. 384,968 | 10/1997 | Scroy . |
| 2,694,263 * | 11/1954 | Francis et al. ......................... 351/44 |
| 3,684,356 | 8/1972 | Bates . |
| 3,953,114 | 4/1976 | Bidgood . |
| 4,354,744 | 10/1982 | Bononi . |
| 4,790,645 | 12/1988 | Gish . |
| 4,813,776 * | 3/1989 | Boros ................................... 351/137 |
| 4,834,524 * | 5/1989 | Boros ................................... 351/137 |
| 4,848,861 | 7/1989 | McCulley . |
| 5,092,666 | 3/1992 | Cress . |
| 5,191,364 * | 3/1993 | Kopfer .................................... 351/62 |
| 5,642,178 | 6/1997 | Leonardi et al. . |
| 5,950,247 | 9/1999 | Huang . |

* cited by examiner

Primary Examiner—Huy Mai
(74) Attorney, Agent, or Firm—John D. Gugliotta

(57) ABSTRACT

A wearable, rigid eyeglass device is provided having a conformable perimeter in combination with an absorbent element for retaining aromatic fluids.

3 Claims, 3 Drawing Sheets

RELAXATION SUNGLASSES HAVING ABSORBENT ELEMENT FOR RETAINING AROMATIC FLUIDS

RELATED APPLICATIONS

The present invention was first described in Disclosure Document No. 469,348, filed on Feb. 18, 2000. There are no previously filed, nor currently any co-pending applications, anywhere in the world.

BACKGROUND OF THE INVENTION

1. Field of the Invention

The present invention relates generally to include eyeglass nose pads or cushions and the like and, more particularly, to a wearable, rigid eyeglass device having a conformable perimeter in combination with an absorbent element for retaining aromatic fluids.

2. Description of the Related Art

Generally, it is a fairly common occurrence for people to fall asleep while traveling as a passenger in a boat, train, plane or other method of transportation. While sleeping in such an environment can never be as enjoyable as sleeping in a bed, there are some steps that may be taken to make the process more relatively relaxing. Perhaps the most important environmental element to be controlled is that of light levels. In the related art, many wear the dark eye masks that are held in place with an elastic strap. While these undoubtedly work, they are also very obvious, and may attract the attention of those wishing to take advantage of someone, especially if traveling by train or bus, where security may be less stringent. Another alternative is to wear sunglasses, but sunglasses are not effective at blocking ambient, extraneous light that may enter around the perimeter of the frame system.

A search of the prior art did not disclose any patents that read directly on the claims of the instant invention; however, the following references were considered related.

The following patents disclose a method and system for conformably fitting eyeglass frames.

U.S. Pat. No. 5,092,666 issued in the name of Cress

U.S. Pat. No. 4,790,645 issued in the name of Gish

The following patents describe the design and function of a pair of cushions for eyeglass earpieces.

U.S. Pat. No. 4,848,861 issued in the name of McCulley

U.S. Pat. No. 3,953,114 issued in the name of Bidgood

U.S. Pat. No. 3,684,356 issued in the name of Bates

U.S. Pat. No. D 384,968 issued in the name of Scroy

U.S. Pat. No. 5,950,247 issued in the name of Huang discloses sports eyeglasses with a buffer and shock-absorbing function.

U.S. Pat. No. 5,642,178 issued in the name of Leonardi, et al. describes sports eyeglasses with soft, resilient connector pads.

U.S. Pat. No. 4,354,744 issued in the name of Bononi discloses an eyeglass frame with an elastic cushion.

Consequently, a need exists for a means by which travelers sleeping as a passenger on varying modes of transportation can be afforded the luxury of sleeping in the dark without attracting attention.

SUMMARY OF THE INVENTION

Therefore, it is an object of the invention to provide for improved relaxation sunglasses.

It is a feature of the present invention to provide sunglasses having absorbent element for retaining aromatic fluids.

Briefly described according to one embodiment of the present invention, a pair of sunglasses are provided with enhanced light blocking capabilities as well as padding system to allow a wearer to sleep while traveling as a passenger. It allows the wearer to sleep in relative comfort and darkness without the obviousness or attention attracting caused by conventional black sleep masks. Upon initial observation, the invention looks like a regular pair of stylish, extremely dark, sunglasses with dark side shields. The entire periphery of the lens area and the side shield area are covered with a soft cloth covered, breathable padding. This padding serves three purposes. First, it provides comfort for the user by alleviating any pressure points the frame may cause. Secondly and most important, the padding provides a means to block out any extraneous light that may enter from around the lens area. Finally, the padding provides a means to store a pleasing scent that will further aid the sleeping process by the use of aroma-therapy techniques.

The use of the present invention allows for passengers in just about any mode of transportation to sleep in daylight hours in comfort without attracting attention. It allows people to sleep in high light levels while not attracting attention like conventional sleep masks. The side shields molded into glasses form an integral part of frame, allowing the glasses to still fold at hinge point. And finally, padding located around entire perimeter of frame is a breathable design keeps wearer cool, provides comfort for the user, keeps out all extraneous light, and allows the padding to be impregnated with pleasing scent.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
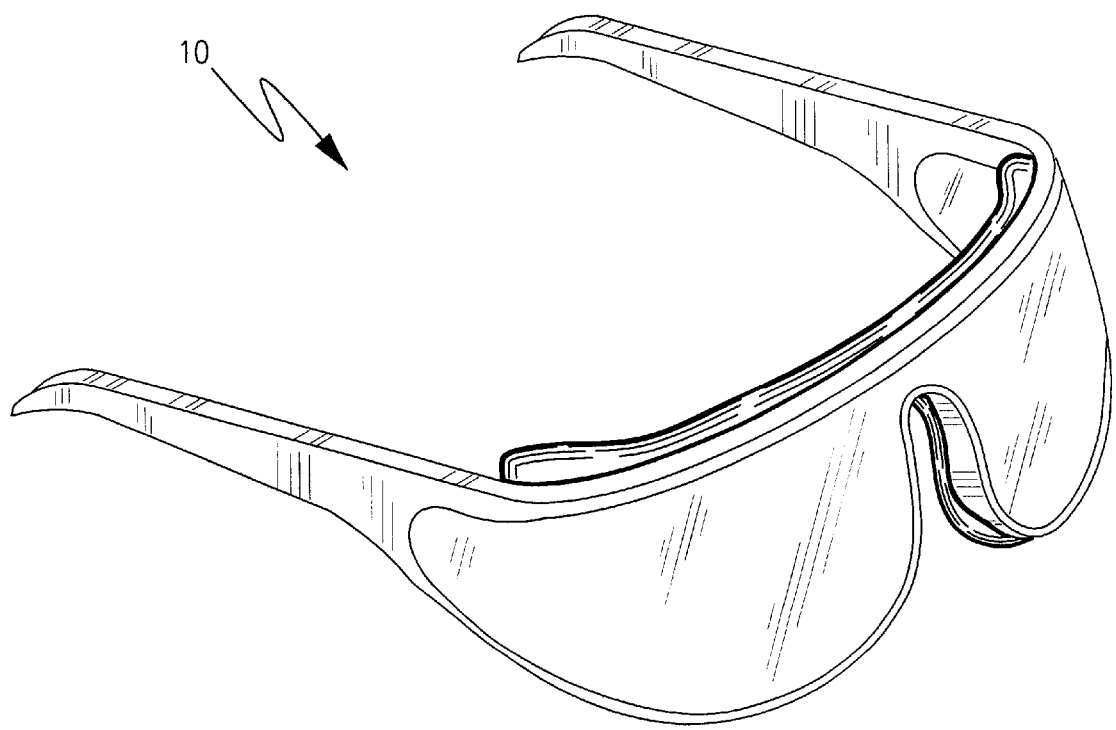
FIG. 1 is a perspective view of a relaxation sunglasses having absorbent element for retaining aromatic fluids according to the preferred embodiment of the present invention.
Figure 2:
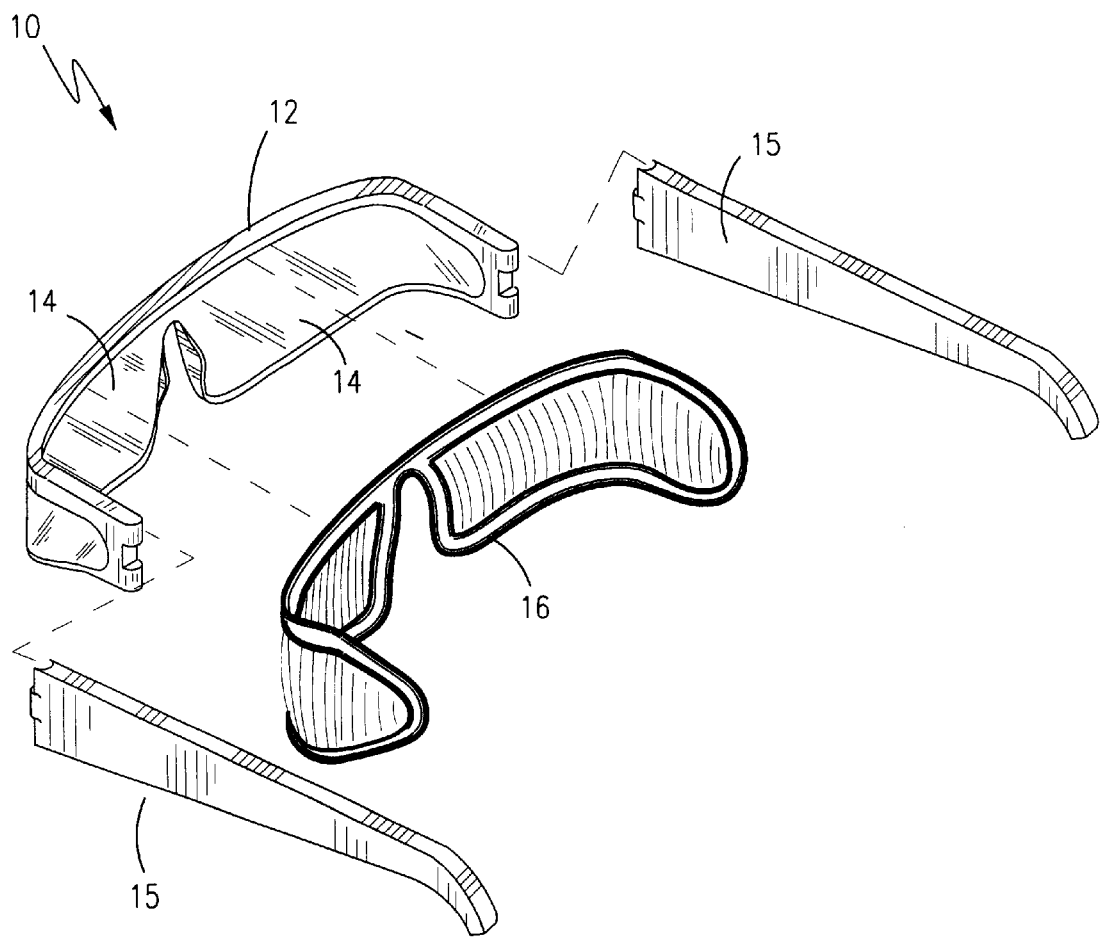
FIG. 2 is an exploded reverse perspective view thereof.
Figure 3:
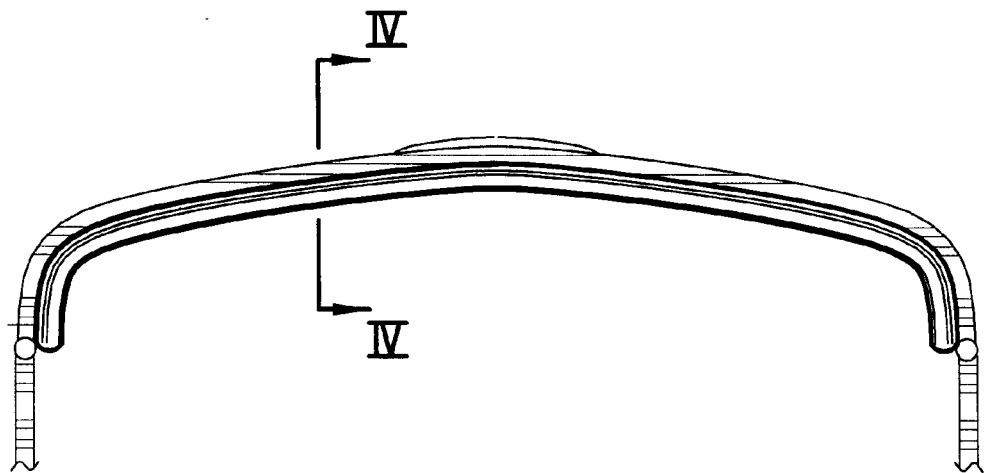
FIG. 3 is a top plan view thereof.

Referring now to FIG. 1 a pair of glasses 10 are provided according to the present invention having an otherwise conventional frame 12 of any conventional design. In that the intended function of the present glasses 12 is for relaxation and not necessarily for improved vision during periods of heightened sunlight or glare, the frame 12 thereby supports a pair of lenses 14 having enhanced light blocking capabilities. Alternately, improved light blocking are anticipated by the use of side shields 15 of construction similar to that of the lenses 14. Also supported along the inner surface periphery of the frame 12 is a padding system 16 to allow a wearer to sleep while traveling as a passenger. It allows the wearer to sleep in relative comfort and darkness without the obviousness or attention attracting caused by conventional black sleep masks.

The entire periphery of the lens area and the side shield area are covered by the padding system 16. This padding serves three purposes. First, it provides comfort for the user by alleviating any pressure points the frame may cause. Secondly and most important, the padding provides a means to block out any extraneous light that may enter from around the lense area. Finally, the padding provides a means to store a pleasing scent that will further aid the sleeping process by the use of aroma therapy techniques.

Figure 4:
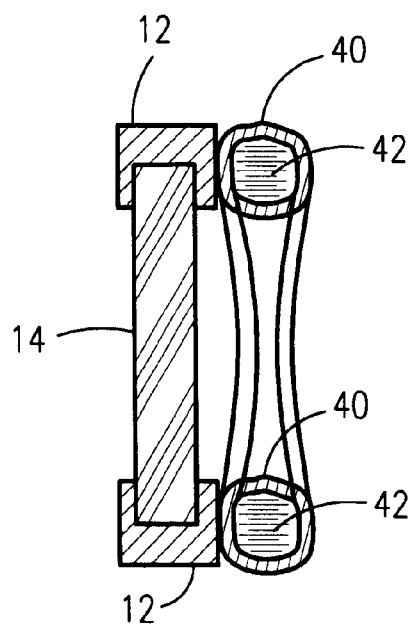
FIG. 4 is a side elevational cross sectional view taken along line IV—IV of FIG. 3.

Details of the padding system are best shown in conjunction with FIG. 4. In its preferred enablement the padding system is comprised of a soft breathable cloth 40 affixed along one point of its radial periphery to the inner periphery of the frame 12. The cloth 40 loosely covers a breathable padding 42 that provides an absorbent retention means for holding and evaporative releasing of aromatic oils of the type commonly utilized in aroma therapy.

2. Operation of the Preferred Embodiment

By impregnating the padding with oils of a pleasing scent, the present invention allows for passengers in just about any mode of transportation to sleep in daylight hours in comfort without attracting attention while obtaining many of the benefits of aroma therapy.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A pair of glasses comprising:

a frame having a contiguous inner periphery;

a pair of lenses supported by said frame;

a padding system supported along said inner surface periphery whereby said padding system forms a conformable perimeter for sealing between said frame and a wearer's face., and wherein said padding system comprises:

a soft breathable cloth affixed along one point of a radial periphery to said inner periphery of said frame;

a breathable padding loosely covered by said soft breathable cloth, wherein said breathable padding provides an absorbent retention means for holding and evaporative releasing aromatic oils of the type commonly utilized in aroma therapy.

2. The pair of glasses of claim 1, wherein said pair of lenses have enhanced light blocking capabilities.

3. The pair of glasses of claim 1, further comprising side shields affixed to sides of said frame.

* * * * *